United States Patent
Kowal et al.

(10) Patent No.: US 10,348,783 B2
(45) Date of Patent: Jul. 9, 2019

(54) CONTROLLING VISIBILITY AND DISTRIBUTION OF SHARED CONFERENCING DATA

(71) Applicant: Cisco Technology, Inc., San Jose, CA (US)

(72) Inventors: Michael A. Kowal, Summit, NJ (US); Stephen M. Orr, Wallkill, NY (US); Binh D. Ha, Fremont, CA (US); Anthony H. Grieco, Wake Forest, NC (US); Catalina Kowal, Summit, NJ (US)

(73) Assignee: Cisco Technology, Inc., San Jose, CA (US)

( * ) Notice: Subject to any disclaimer, the term of this patent is extended or adjusted under 35 U.S.C. 154(b) by 314 days.

(21) Appl. No.: 15/292,212

(22) Filed: Oct. 13, 2016

(65) Prior Publication Data
US 2018/0109570 A1    Apr. 19, 2018

(51) Int. Cl.
| | | |
|---|---|---|
| *H04N 1/32* | (2006.01) | |
| *H04L 29/06* | (2006.01) | |
| *G06F 21/62* | (2013.01) | |
| *G06F 21/16* | (2013.01) | |
| *H04L 29/08* | (2006.01) | |

(52) U.S. Cl.
CPC ............ *H04L 65/403* (2013.01); *G06F 21/16* (2013.01); *G06F 21/6218* (2013.01); *H04L 63/08* (2013.01); *H04L 63/10* (2013.01); *H04L 65/1089* (2013.01); *G06F 2221/0733* (2013.01); *H04L 67/18* (2013.01); *H04L 2463/103* (2013.01); *H04N 1/32144* (2013.01)

(58) Field of Classification Search
CPC ....... H04L 65/403; H04L 63/10; H04L 63/08; H04L 67/18; H04L 65/1089; H04L 2463/103; G06F 21/6218; G06F 21/16; G06F 2221/0733
See application file for complete search history.

(56) References Cited

U.S. PATENT DOCUMENTS

| | | | |
|---|---|---|---|
| 6,961,858 B2 | 11/2005 | Fransdonk | |
| 7,672,373 B2 | 3/2010 | Toebes et al. | |
| 8,272,067 B2 | 9/2012 | Toebes et al. | |
| 8,332,646 B1 * | 12/2012 | Staley | H04N 5/913 380/201 |
| 9,135,673 B2 | 9/2015 | Chalamala et al. | |
| 9,251,760 B2 | 2/2016 | Bracalente et al. | |
| 9,367,885 B2 | 6/2016 | Hua | |
| 2007/0217649 A1 * | 9/2007 | Lowe | G10L 19/018 382/100 |

(Continued)

*Primary Examiner* — Michael A Keller
(74) *Attorney, Agent, or Firm* — Edell, Shapiro & Finnan, LLC

(57) ABSTRACT

A meeting server receives shared content from a presenter device in an online conference session with one or more attendee devices. The meeting server generates one or more digital watermarks corresponding to the one or more attendee devices. Each respective digital watermark includes an indication of the presenter device and an indication of a respective attendee device. The meeting server transmits the shared content with the respective digital watermark to the respective attendee device as part of the online conference session. The respective digital watermark is visible in the shared content displayed on the respective attendee device.

20 Claims, 7 Drawing Sheets

(56) References Cited

U.S. PATENT DOCUMENTS

| | | | |
|---|---|---|---|
| 2008/0263648 A1* | 10/2008 | Sathyan | H04L 9/32 726/7 |
| 2014/0117073 A1* | 5/2014 | Bell | H04L 12/1818 235/375 |
| 2015/0286843 A1* | 10/2015 | Brant | G06F 21/16 713/178 |
| 2016/0241500 A1* | 8/2016 | Bostick | H04L 51/10 |

* cited by examiner

CONTROLLING VISIBILITY AND DISTRIBUTION OF SHARED CONFERENCING DATA

TECHNICAL FIELD

The present disclosure relates to online conference sessions.

BACKGROUND

Online conference sessions allow participants from around the world to communicate and share ideas. Businesses save time and money with online conferences as well as improve internal and external communications. One major advantage of online conferencing over traditional telephone bridges is the capability to share content with other users. The content may include presentations, text documents, graphical images, virtual whiteboards, video clips, etc.

DESCRIPTION OF EXAMPLE EMBODIMENTS

Overview

Figure 1:
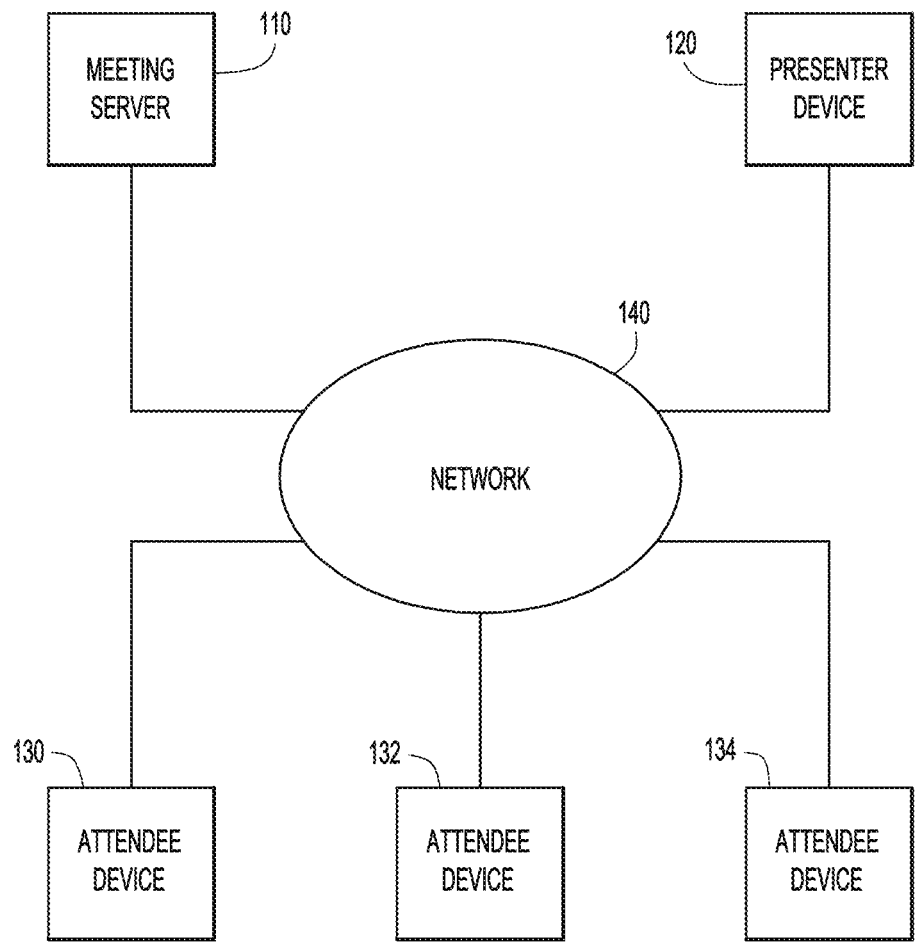
FIG. 1 is a block diagram of a system of devices configured to participate in an online conference session according to an example embodiment.

A meeting server receives shared content from a presenter device in an online conference session with one or more attendee devices. The meeting server generates one or more digital watermarks corresponding to the one or more attendee devices. Each respective digital watermark includes an indication of the presenter device and an indication of a respective attendee device. The meeting server transmits the shared content with the respective digital watermark to the respective attendee device as part of the online conference session. The respective digital watermark is visible in the shared content displayed on the respective attendee device.

Detailed Description

Sharing digital copies of documents in an online conference presents an opportunity for anyone in the online conference to duplicate and disseminate potentially sensitive information to other users outside of the online conference. One example of an online conference service is the WebEx® online conference service of Cisco Systems, Inc. One challenge in sharing content with other users lies in controlling how it is viewed or whether it can be further distributed, since online conference session typically share image data with participants, and any participant can merely capture the screen data to create a copy of the content. Additionally, recordings of the online conference may be made and viewed at a later time.

Typical watermarking systems are concerned with marking the content once and then distributing it, but large-scale sharing or distribution via an online conference session poses different challenges. Marking the content prior to the online conference session only informs an auditor about the source of the content, such as who created/shared it and/or a status (e.g., draft, final, highly confidential, etc.). When content that was shared with a group of users during an online conference session appears in an unauthorized venue (e.g., a public website), it would be beneficial to understand who leaked the content in addition to knowing the origin of the leaked content.

In one example, an engineering team that is working on a highly confidential product requests feedback from select sales teams. The engineering team does not want to email a copy of the presentation, which contains highly confidential information, so it is decided to share the presentation as part of an online conference session. A sales person from the selected sales team may take a screenshot of the shared content and distribute it to all of the sales teams, creating a larger distribution of the content than the engineering team originally intended.

In another example, a reseller may ask vendor A for assistance in competing with products offered by vendor B. The sales team from vendor A shares competitive information about vendor B's products with the reseller via an online conference. The reseller may take a screenshot of the shared content and distribute it to vendor B without permission from vendor A.

In a further example, a stealth startup (i.e., a startup company that avoids public attention) is introducing a new product to a limited number of customers in order to hide information from competitors. The customers sign non-disclosure agreements and attend an online conference for the new product briefing. A few days later, screenshots of the presentation appear on a public blog.

In yet another example, an engineering team may record an online conference to discuss confidential details of implementing a project. At a later time, one of the members of the engineering team replays the recording of the online conference to show a sales team the results of the project, but also reveals the confidential implementation details outside the engineering team.

Each of these examples highlights a deficiency in control of content when shared in the otherwise uncontrolled environment of an online conference session. Once the shared content is sent to any attendee in the online conference session, the attendee's device controls the data and can make unregulated copies (e.g., screen shots) without any recourse for the presenter of the shared content. The attendee may inadvertently, or maliciously, cause information that was only meant for limited viewing to be available for viewing by a wider audience.

Referring now to FIG. 1, an online conference system 100 is shown in which a meeting server 110 facilitates on online conference session (e.g., a web conference/meeting). Participants in the online conference may share text documents, presentation slides, voice, video, chat, and/or other types of data communications from presenter device 120 to attendee devices 130, 132, and 134 through network 140. The online conference session may further comprise desktop sharing and/or application sharing. Only three attendee devices are shown in FIG. 1, but any number of attendee devices may be included in system 100.

Additionally, the presenter device 120 and attendee devices 130, 132, and 134 may have the same capabilities in the online conference session, with the exception that the presenter device 120 is designated, during some period of time, to share content with the attendee devices in the online conference session. The designation of "presenter device" may change throughout the online conference session, and is used herein merely to specify which of the participant devices is currently sharing content. In general, presenter device 120 and attendee devices 130, 132, and 134 may take a variety of forms, including a desktop computer, laptop computer, mobile/cellular phone (e.g., smart phone), tablet computer, Internet telephone, etc. Network 140 may be any type of network (e.g., any combination of Internet, intranet, local area network (LAN), wide area network (WAN), wired network, wireless network, etc.) that connects computing devices, e.g., presenter device 120 and attendee devices 130, 132, and 134.

Meeting server 110 may be used, for example, to mediate communications between presenter device 120 and attendee devices 130, 132, and 134. Server 110 may also perform caching or other time/bandwidth saving techniques. It should be understood that in a web-based conference system, each device may communicate with the server 110 through a browser application having one or more plug-ins that enable the web-based meeting experience, and allow for the transmission of data to the meeting server 110, and the reception of data from the meeting server during a conference/meeting session.

Figure 2:
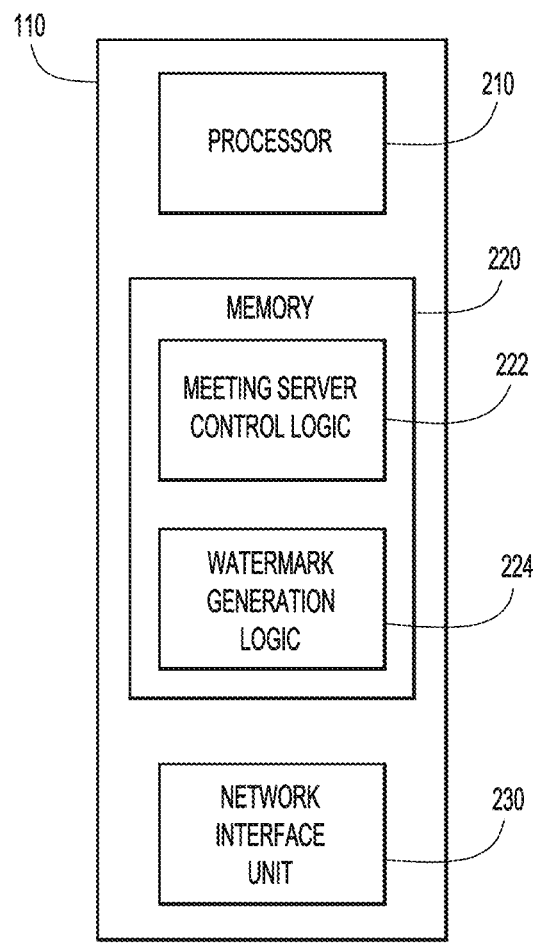
FIG. 2 is a block diagram of a meeting server configured to facilitate the online conference session according to an example embodiment.

Referring now to FIG. 2, a simplified block diagram of meeting server 110 is shown. Server 110 includes a processor 210 to process instructions relevant to an online conference session supported by the system 100, memory 220 to store a variety of data and software instructions (e.g., audio, video, control data, etc.), including meeting server control logic/software 222 and watermark generation logic/software 224. The server 110 also includes a network interface unit (e.g., card) 230 that enables network communications so that the server 110 can communicate with other devices, e.g., the presenter and attendee devices, as explained in further detail hereinafter. Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software (e.g., the meeting server control logic/software 222 or watermark generation logic/software 224) comprising computer executable instructions and when the software is executed (by the processor 210) it is operable to perform the operations described herein.

In one example, the techniques presented herein combine metadata of an online conference, distributed sharing of content over the online conference, and digital watermarks that are attached to the shared content in real time to control distribution of shared content. The metadata may include login credentials of participants, email addresses, Internet Protocol (IP) addresses, date and time information, among other data as described hereinafter. In one example, the watermarks may be visible without impairing ordinary viewing, but placed within the shared content to prevent removal of the watermark. In another example, the metadata may include a digital and encrypted signature that is not visible in the online conference. The signature may be used to prevent fraudulent modification of the metadata, which would affect the content of the digital watermark that is visible on the shared content.

Combining the metadata, distributed sharing of content, and the application of watermarks in real-time, the meeting server 110 provides accountability for the distribution of shared content. Each participant logs into the online conference using their own authentication credentials. One participant (i.e., the presenter) selects a document (e.g., a presentation) to share and marks an option to include a watermark to control distribution. The presenter may choose a confidentiality designation, e.g., confidential, highly confidential, to clearly inform the other participants (i.e., the attendees) that the shared document should not be shared beyond the online conference session.

The meeting server 110 embeds a per-user watermark into the shared document in real-time. The per-user watermark comprises a custom watermark made for each attendee that is viewing the shared document. In one example, the watermark includes usernames and/or email addresses for both the user who originally shared the content (i.e., the presenter) and the user that is viewing the content (i.e., the attendee). The meeting server 110 may have access to additional information that may also be embedded into the watermark, such as IP addresses of the presenter's device and/or the attendee's device, the physical location of the presenter and/or attendee, the date and time at which the document was initially shared, a username and/or email address of each participant's supervisor.

Figure 3:
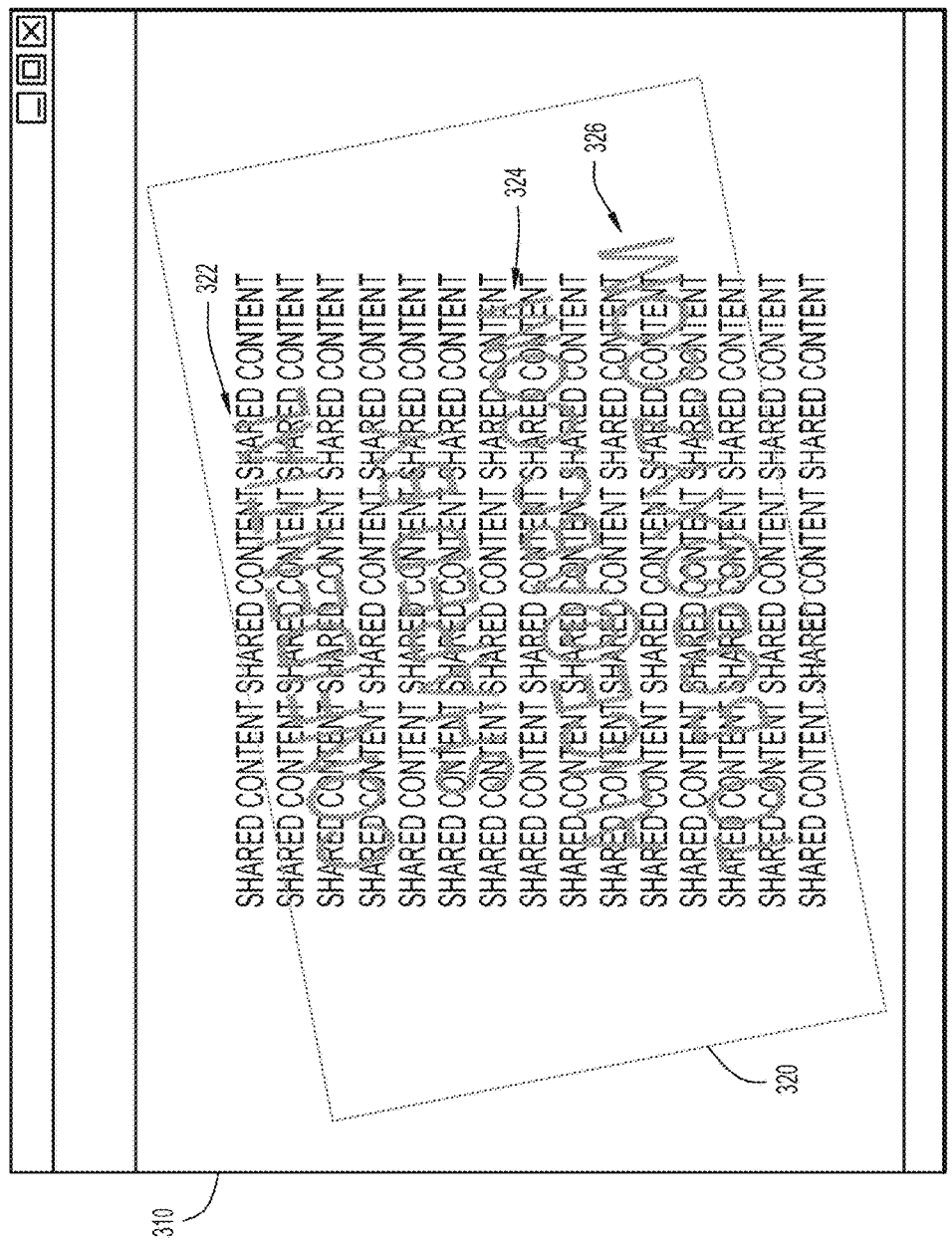
FIG. 3 is an example screenshot of a shared document with a digital watermark that is sent to an attendee device, according to an example embodiment.

Referring now to FIG. 3, an example of a page of a shared document with a per-user watermark is shown as it would be displayed on a particular attendee device 130. A visible portion 310 of the shared document is being shared in an online conference session. When the visible portion 310 is sent to an attendee device (e.g., attendee device 130), a digital watermark 320 is embedded into the image of the document sent to the attendee device. The digital watermark 320 includes a designation 322 indicating that the document 310 is confidential. The digital watermark 320 also includes an email address 324 of the presenter sharing the visible portion 310 of the shared document and an email address 326 of the attendee who is viewing the portion 310. In one example, the email address 324 and the email address 326 are obtained by the meeting server 110 when the presenter device and the attendee device logged into the meeting server for the online conference.

As shown in FIG. 3, the watermark 320 is clearly visible and overlaps the visible portion 310 of the shared document without significantly affecting the readability of the shared content. However, the attendee is not able to easily remove the watermark 320 (e.g., by pasting an opaque box over the watermark) without removing a significant portion of the content. Removing the watermark 320 or any significant portion of the watermark would render the visible portion 310 of the shared document incomprehensible.

Additional digital watermarking techniques may be used to protect against more sophisticated removal techniques. In one example, the meeting server 110 may scan the shared content and determine where to place the watermark on the shared content in order to prevent active attacks on the watermark. For instance, a slide from a presentation which contains highly confidential material may include large blank areas. The meeting server 110 would determine that the watermark 320 should not be placed in the large blank areas, as attendees would be easily able to remove the watermark. The meeting server 110 would determine an optimal location to place the watermark 320. The optimal placement would balance the readability of the slide and the resilience of the watermark to attack. The goal would be to insert the watermark 320 into a location where, if the attendee tried to remove the watermark, then the shared content would be useless.

In one example, one or more validation models (e.g., checksum) may be used to ensure the integrity of the watermark 320. Any modification to the watermark 320 results in a changed checksum value that fails to validate the authenticity of the shared content. Additionally, the validation model may intentionally corrupt the display of some or all of the shared document when the watermark 320 is not authenticated. In one example, the validation model may be applied to recordings of an online conference such that any attempt to distribute the shared document with a digitally removed or modified watermark (e.g., with photo editing software) would result in corruption of the recording. In another example, an attendee device 130 that detects a failure of the validation model (e.g., an inconsistent checksum) may notify the presenter device 120, the meeting server 110, and/or a separate monitoring facility about the potential tampering with the watermark 320.

Typically, a user's enjoyment or understanding of the content is taken into account in placing watermarks in large scale controlled distribution of content, especially audio/video content. When attaching a watermark to shared content for controlling distribution in an online conference session, the goal is to make sure that information is still conveyed (e.g., viewable) regardless of user enjoyment or appreciation for graphic design. In this case, no techniques to analyze/preserve the aesthetic of the shared content is required, so long as a user is able to understand (e.g., read) the shared content.

In another example, the shared content may include multimedia (e.g., video, and/or audio) as well as text and graphical information. The watermark may be generated to cover the multimedia content as well as the text/graphics, e.g., by inserting a visual watermark into each frame of video. Audio content may also be watermarked, e.g., with low volume and/or pitch modulation. While the watermarks described herein are generally described as visual watermarks, shared content in any format may be watermarked such that the watermark is difficult to remove from the shared content and is trackable back to the presenter who shared the content and the attendee who received the content.

In a further example, the meeting server may have the capability to switch between watermarking techniques, allowing the meeting server to quickly respond to changes in watermarking techniques. Defeating one watermarking scheme does not generally defeat other schemes, and the meeting server may switch schemes or overlap schemes to further strengthen the watermark from attack.

Figure 4:
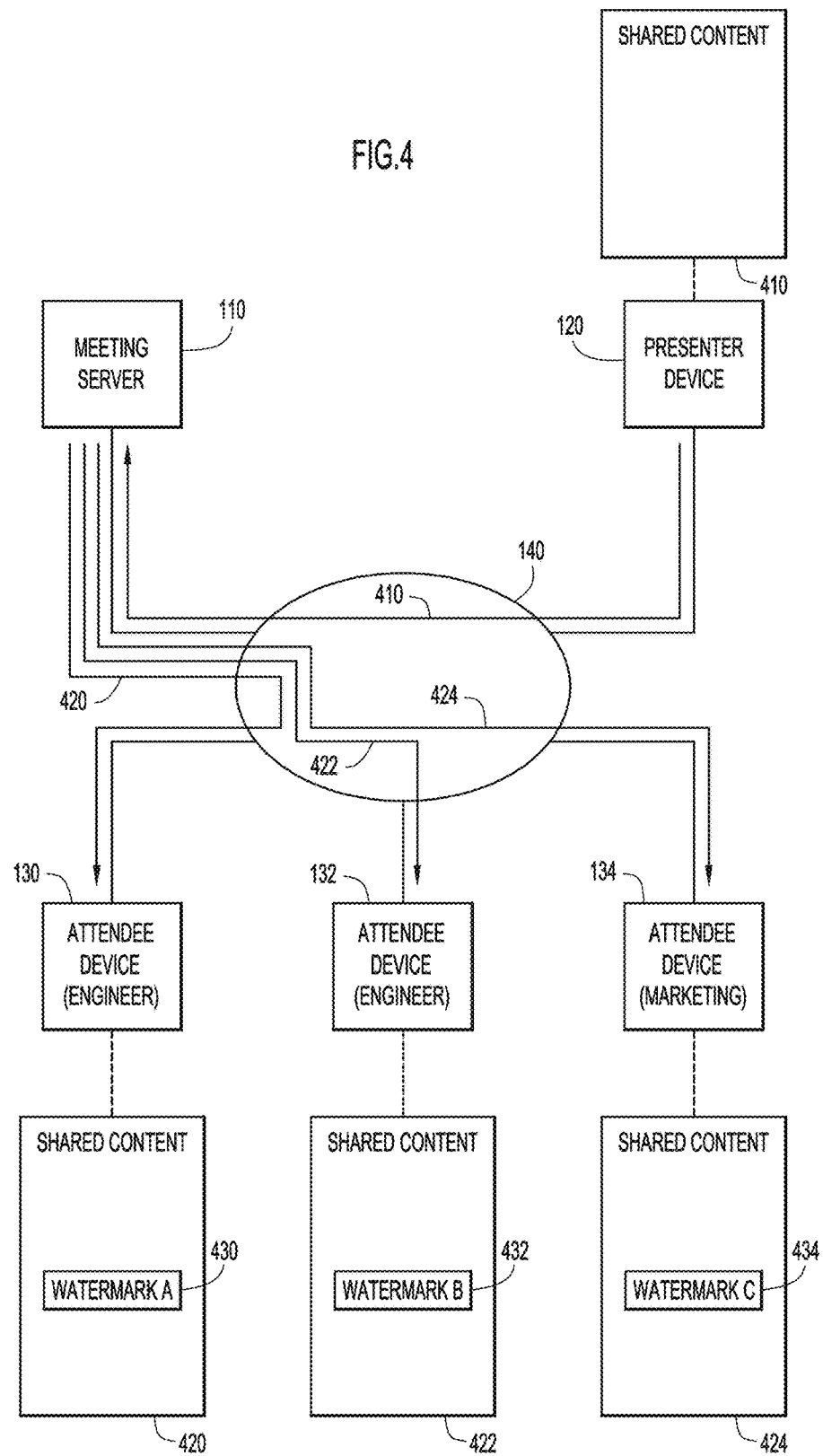
FIG. 4 is a block diagram showing the shared content being shared with per-attendee watermarks, according to an example embodiment.

Referring now to FIG. 4, a simplified block diagram shows an online conference with watermarked content shared between a presenter device 120 and attendee devices 130, 132, and 134. The presenter device 120 and attendee devices 130, 132, and 134 each log in to the online conference session hosted by the meeting server 110. The presenter device 120 sends shared content 410 to the meeting server 110 for distribution to all of the attendee devices. The meeting server 110 transmits shared content 420 to the attendee device 130. The shared content 420 that is sent to the attendee device 130 includes a watermark 430 specific to the attendee device 130. Similarly, the meeting server 110 sends shared content 422 including watermark 432 specific to the attendee device 132. Additionally, the meeting server sends shared content 424 including watermark 434 specific to the attendee device 134.

Each of the watermarks 430, 432, and 434 are different and include identification information for the attendee device 130, 132, and 134, respectively. Each watermark 430, 432, and 434 also includes identification of the presenter device 120. The watermarks 430, 432, and 434 may also include additional information available to the meeting server 110, including information that may not be available to the presenter device 120 or the attendee devices 130, 132, and 134. In one example, usernames or email address may be used to identify the presenter and attendee in the watermarks 430, 432, and 434. Alternatively, the identifying information included in the watermark may be encoded (or scrambled) to protect the identity of the presenter and/or attendee, while still being traceable to the particular presenter and attendee. For instance, the identifying information may be encoded as a quasi-random string of alphanumeric characters that is associated (e.g., in a database on the meeting server 110) with the usernames/email address of the presenter and/or attendees.

Additionally, the online conferencing system 100 may be integrated with back-end servers of organizations associated with one or more of the presenter device 120 and/or attendee devices 130, 132, and 134 to include information that may not be stored by the meeting server 110. In one example, the user of the presenter device 120 may be sharing TOP SECRET material (i.e., material with severe repercussions for data leaks) via the online conference. When the presenter device 120 shares a document under the online conferencing system, the meeting server 110 may poll a human resources database for information to include in the watermark applied to the shared content 410. For instance, the name and/or contact information for the presenter's supervisor may be included in the watermark to facilitate prompt action on the discovery of any improper sharing of TOP SECRET information.

In another example, the online conference session may be recorded for later playback. A user may request a recording from the meeting server 110, or a separate recording server (not shown). If the online conference session includes shared content subject to distribution restrictions, the meeting server 110 inserts a watermark as described herein. However, the watermark would be rendered into the recording of the online conference session before the user can access the recording. The watermark is rendered on a per-user, per-request basis and includes identifiers for the presenter who shared the content as well as the user who is requesting the recording of the online conference session. If the recording of the online conference session does not contain any shared content that is marked for controlled distribution, then the meeting server 110 does not incur the overhead in generating and inserting the watermark.

Since the online conference system requires each participant of the online conference session to log in, the meeting server 110 can use the login credentials to generate the watermarks. The meeting server 110 may also use attributes of the attendee devices 130, 132, and 134 to prevent restricted content from being viewed at all. For instance, a sales person could mistakenly join an engineering online conference session. When someone from the engineering team shares content, that person would be able to classify the document for watermarking as well as specify viewing restrictions. The viewing restrictions may be based on user groups by designating that the document can be viewed only by users that belong to the engineering user group. In this instance, the sales person does not belong to the engineering user group, and the content would not be shared with that user's device.

Figure 5:
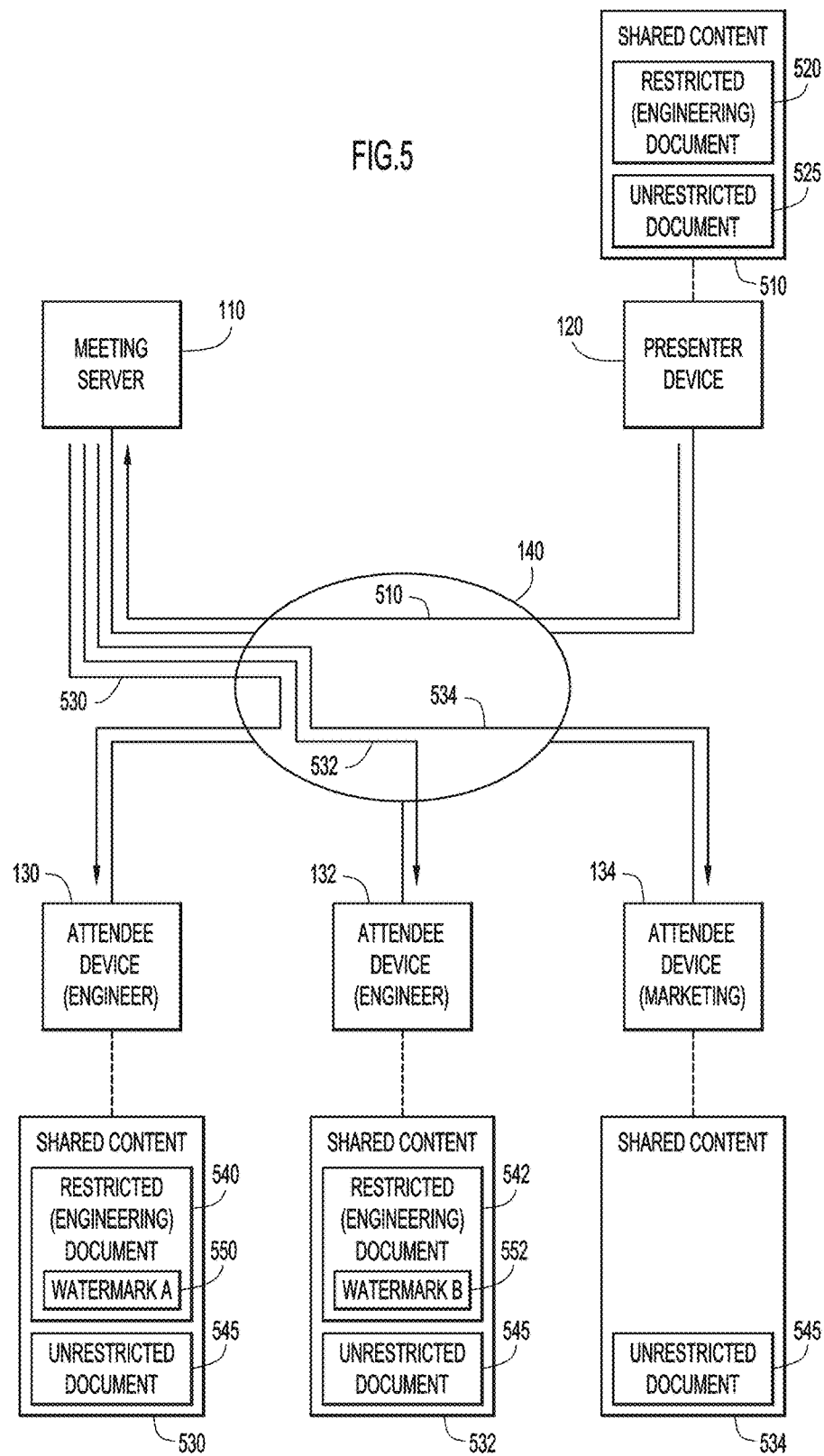
FIG. 5 is a block diagram showing shared content being partially restricted on a per-attendee basis, according to an example embodiment.

Referring now to FIG. 5, a simplified block diagram shows another example of an online conference between presenter device 120 and attendee devices 130, 132, and 134. The presenter shares content 510 which includes a restricted document 520 and an unrestricted document 525. In one example, the presenter marks the restricted document 520 as restricted to users in the Engineering user group. The presenter device 120 sends the shared content 510 to the meeting server 110.

The meeting server 110 determines that the attendee devices 130 and 132 are logged in to the online conference session by users in the Engineering group and attendee device 134 is logged in to the online conference session by a user in the Marketing group. The meeting server forwards individualized shared content 530, 532, and 534 to the attendee devices 130, 132, and 134, respectively. The individualized shared content 530, 532, and 534 are versions of the shared content 510 that include content appropriate for each user logged in to the their respective attendee devices. Shared content 530 includes the restricted document 540 and the unrestricted document 545. Shared content 532 includes the restricted document 542 and the unrestricted document 545. Shared content 534 includes only the unrestricted document 545, since the attendee using the attendee device 134 does not belong to the Engineering user group.

Each version of the restricted document includes a watermark that identifies the presenter device as well as the respective attendee device. The restricted document 540 sent to attendee device 130 as part of shared content 530 includes a watermark 550. Watermark 550 indicates that the content was shared by the presenter device 120 and was viewed at the attendee device 130. The restricted document 542 sent to the attendee device 132 as part of the shared content 532 includes a watermark 552. Watermark 552 indicates that the content was shared by the presenter device 120 and was viewed at the attendee device 132. The watermarks 550 and 552 may also include additional information, such as IP addresses of the presenter device 120 and/or the attendee devices 130 or 132, an indication of the location of the presenter device 120 and/or the attendee devices 130 or 132, and/or the date and/or time that the restricted document 520 was initially shared.

Figure 6:
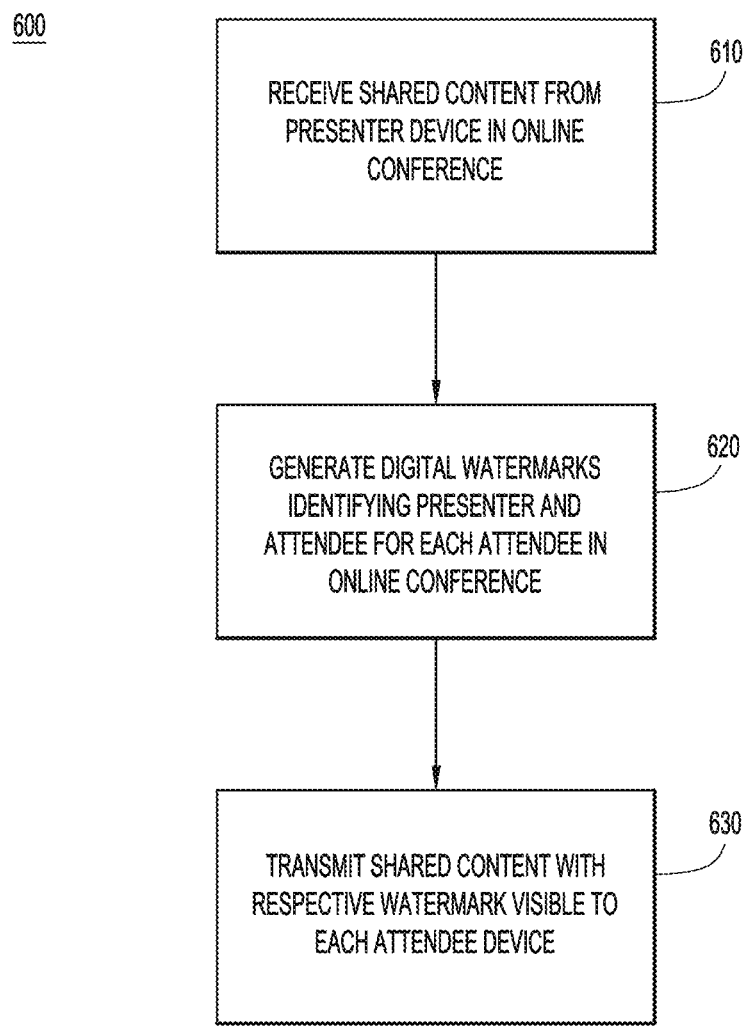
FIG. 6 is a flow chart depicting operations performed by a meeting server sharing content that is digitally watermarked with presenter and attendee information according to an example embodiment.

Referring now to FIG. 6, a flowchart shows an example process 600 of operations performed by a meeting server in processing shared documents for restricted disclosure. In step 610, the meeting server receives shared content from a presenter device in an online conference session with one or more attendee devices. In one example, the shared content may be marked for limited/tracked distribution. In step 620, the meeting server generates one or more digital watermarks corresponding to the one or more attendee devices in the online conference session. Each digital watermark includes an indication of the presenter device and an indication of one attendee device. In step 630, the meeting server transmits the shared content with the respective digital watermark to the respective attendee device as part of the online conference session. In one example, the digital watermark is visible in the shared content displayed on each respective attendee device.

Figure 7:
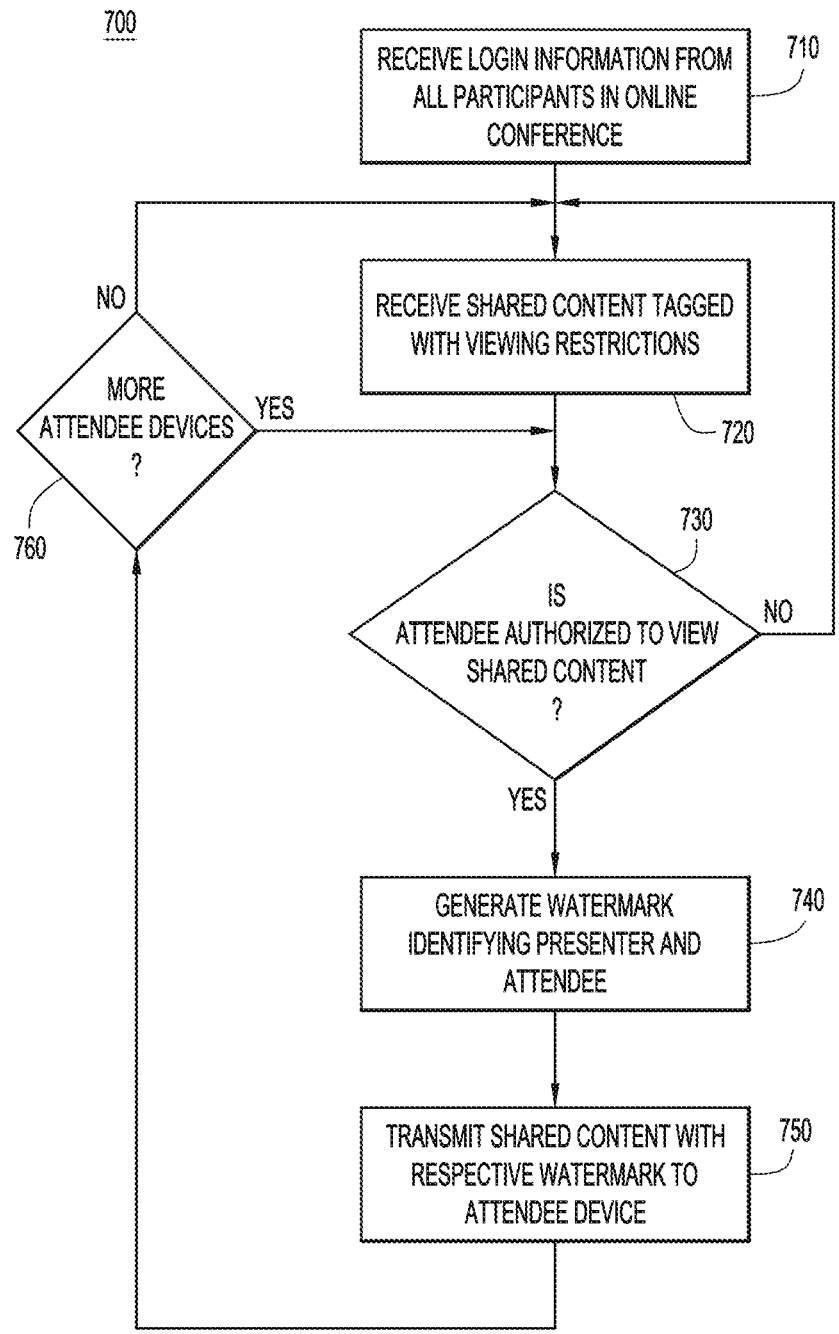
FIG. 7 is a flow chart depicting operations performed by a meeting server sharing content with authorized attendee devices according to an example embodiment.

Referring now to FIG. 7, a flowchart shows an example process 700 of operations performed by a meeting server in processing shared documents for restricted disclosure and viewing. In step 710, the meeting server receives login information from all of the participants in an online conference session. In one example, the login information may include usernames and/or email addresses, and may be cryptographically verified between the meeting server and each participant's device. In step 720, the meeting server receives shared content (e.g., a shared document) that is tagged with viewing restrictions. In one example, the viewing restrictions may specify user groups that are either allowed or disallowed from viewing the shared content.

For each attendee device in the online conference session, in step 730, the meeting server determines if the attendee device is authorized to view the shared content. If the attendee device is not authorized to view the shared content, the meeting server does not share anything with the attendee device and returns to wait for additional shared content. If the attendee device is authorized to view the shared content, then the meeting server generates a watermark identifying the presenter and the attendee in step 740. In one example, the watermark may also include additional information about the online conference session and/or any of the participants in the online conference session. In step 750, the meeting server transmits the shared content with the watermark to the attendee device. If there are additional attendee devices, as determined in step 760, then the process returns to step 730 and determines if the additional attendee device is authorized. Watermarks are generated for any authorized attendee devices and the shared content is sent to the authorized attendee devices with the appropriate watermark inserted into the shared content.

In summary, the techniques presented herein provide for centralized control of content that is being shared via an online conference session, such as a web conference, using metadata (e.g., login credentials, IP addresses, etc.) and watermarking to determine who shared and who viewed the shared content in order to prevent unauthorized distribution.

In one form, a method is provided that is performed by a meeting server. The method includes receiving shared content from a presenter device in an online conference session with one or more attendee devices. One or more digital watermarks are generated corresponding to the one or more attendee devices. Each respective digital watermark includes an indication of the presenter device and in indication of a respective attendee device. The meeting server transmits the shared content with the respective digital watermark to the respective attendee device as part of the online conference session. The respective digital watermark is visible in the shared content displayed on the respective attendee device.

In another form, an apparatus is provided comprising a network interface unit and a processor. The network interface unit (e.g., a network interface card or multiple network interface cards) is configured to communicate data in an online conference session among a one or more attendee devices and a presenter device. The processor is configured to receive shared content from the presenter device in the online conference session via the network interface unit. The processor is also configured to generate one or more digital watermarks corresponding to the one or more attendee devices. Each respective digital watermark includes an indication of the presenter device and an indication of a respective attendee device. The processor is further configured to cause the network interface unit to transmit the shared content with the respective digital watermark to the respective attendee device as part of the online conference session.

The respective digital is visible in the shared content displayed on the respective attendee device.

In still another form, one or more non-transitory computer readable storage media are provided that are encoded with computer executable instructions. The computer executable instructions are operable to cause a process to receive shared content from a presenter device in an online conference session with one or more attendee devices. The instructions are further operable to cause the processor to generate one or more digital watermarks corresponding to the one or more attendee devices. Each respective digital watermark includes an indication of the presenter device and an indication of a respective attendee device. The instructions are further operable to cause the process to transmit the shared content with the respective digital watermark to the respective attendee device as part of the online conference session. The respective digital watermark is visible in the shared content displayed on the respective attendee device.

The above description is intended by way of example only. Various modifications and structural changes may be made therein without departing from the scope of the concepts described herein and within the scope and range of equivalents of the claims.

What is claimed is:

1. A computer-implemented method comprising:
receiving shared content from a presenter device in an online conference session with one or more attendee devices;
generating a digital watermark corresponding to a particular attendee device of the one or more attendee devices, the digital watermark including an indication of the presenter device and an indication of the particular attendee device; and
transmitting the shared content with the digital watermark to the particular attendee device as part of the online conference session, wherein the digital watermark is visible in the shared content displayed on the particular attendee device.

2. The method of claim 1, wherein the indication of the particular attendee device comprises authenticated login information from the particular attendee device, and the indication of the presenter device comprises authenticated login information from the presenter device.

3. The method of claim 2, further comprising determining whether an attendee associated with the authenticated login information from the particular attendee device has permission to view the shared content, and responsive to a determination that the attendee does not have permission to view the shared content, removing the shared content from the online conference session for the particular attendee device.

4. The method of claim 3, wherein the shared content comprises a page shared within the online conference session, and the page is associated with a confidentiality designation that is used in the determining whether the attendee does not have permission to view the shared content.

5. The method of claim 1, wherein the digital watermark includes one or more of a network address of the presenter device, a network address of the particular attendee device, a location of the presenter device, a location of the particular attendee device, or a time at which the shared content was initially received.

6. The method of claim 1, further comprising inserting the digital watermark in the shared content such that subsequent removal of the digital watermark renders the shared content incomprehensible.

7. The method of claim 1, further comprising:
storing a recording of the online conference session including the shared content;
receiving a request for the recording from a user device;
generating a new digital watermark that includes the indication of the presenter device and an indication of the user device that requested the recording; and
transmitting the recording of the online conference session to the user device, the recording including the shared content with the new digital watermark.

8. An apparatus comprising:
a network interface unit configured to communicate data in an online conference session among one or more attendee devices and a presenter device; and
a processor configured to:
receive shared content from the presenter device in the online conference session via the network interface unit;
generate a digital watermark corresponding to a particular attendee device of the one or more attendee devices, the digital watermark including an indication of the presenter device and an indication of the particular attendee device; and
cause the network interface unit to transmit the shared content with the digital watermark to the particular attendee device as part of the online conference session, wherein the digital watermark is visible in the shared content displayed on the particular attendee device.

9. The apparatus of claim 8, wherein the indication of the particular attendee device comprises authenticated login information from the particular attendee device, and the indication of the presenter device comprises authenticated login information from the presenter device.

10. The apparatus of claim 9, wherein the processor is further configured to determine whether an attendee associated with the authenticated login information from the particular attendee device has permission to view the shared content, and responsive to a determination that the attendee does not have permission to view the shared content, the process is configured to remove the shared content from the online conference session for the particular attendee device.

11. The apparatus of claim 10, wherein the shared content comprises a page shared within the online conference session, and the page is associated with a confidentiality designation that is used in the determining whether the attendee does not have permission to view the shared content.

12. The apparatus of claim 8, wherein the digital watermark includes one or more of a network address of the presenter device, a network address of the particular attendee device, a location of the presenter device, a location of the particular attendee device, or a time at which the shared content was initially received.

13. The apparatus of claim 8, wherein the processor is further configured to insert the digital watermark in the shared content such that subsequent removal of the digital watermark renders the shared content incomprehensible.

14. The apparatus of claim 8, wherein the processor is further configured to:
store a recording of the online conference session including the shared content;
receive from a user device via the network interface unit, a request for the recording;
generate a new digital watermark that includes the indication of the presenter device and an indication of the user device that requested the recording; and cause the network interface unit to transmit the recording of the online conference session to the user device, the recording including the shared content with the new digital watermark.

15. One or more non-transitory computer readable storage media encoded with computer executable instructions operable to cause a processor to:

receive shared content from a presenter device in an online conference session with one or more attendee devices;

generate a digital watermark corresponding to a particular attendee device of the one or more attendee devices, the digital watermark including an indication of the presenter device and an indication of the particular attendee device; and transmit the shared content with the digital watermark to the particular attendee device as part of the online conference session, wherein the digital watermark is visible in the shared content displayed on the particular attendee device.

16. The computer readable storage media of claim 15, wherein the indication of the particular attendee device comprises authenticated login information from the particular attendee device, and the indication of the presenter device comprises authenticated login information from the presenter device, and further comprising executable instructions operable to cause the processor to determine whether an attendee associated with the authenticated login information from the particular attendee device has permission to view the shared content, and responsive to a determination that the attendee does not have permission to view the shared content, the executable instructions cause the processor to remove the shared content from the online conference session for the particular attendee device.

17. The computer readable storage media of claim 16, wherein the shared content comprises a page shared within the online conference session, and the page is associated with a confidentiality designation that is used in the determining whether the attendee does not have permission to view the shared content.

18. The computer readable storage media of claim 15, wherein the digital watermark includes one or more of a network address of the presenter device, a network address of the particular attendee device, a location of the presenter device, a location of the particular attendee device, or a time at which the shared content was initially received.

19. The computer readable storage media of claim 15, further comprising executable instructions operable to cause the processor to insert the digital watermark in the shared content such that subsequent removal of the digital watermark renders the shared content incomprehensible.

20. The computer readable storage media of claim 15, further comprising executable instructions operable to cause the processor to:

store a recording of the online conference session including the shared content;

receive a request for the recording from a user device;

generate a new digital watermark that includes the indication of the presenter device and an indication of the user device that requested the recording; and transmit the recording of the online conference session to the user device, the recording including the shared content with the new digital watermark.

* * * * *